(12) United States Patent
Bigex et al.

(10) Patent No.: US 9,046,207 B2
(45) Date of Patent: Jun. 2, 2015

(54) LINE FOR TRANSPORTING A FLUID CONTAINING A HYDROCARBON, AND METHOD FOR PRODUCING SUCH A LINE

(75) Inventors: Thibaud Bigex, Pau (FR); Jérome Woirin, Pau (FR)

(73) Assignee: Total SA, Courbevoie (FR)

( * ) Notice: Subject to any disclaimer, the term of this patent is extended or adjusted under 35 U.S.C. 154(b) by 208 days.

(21) Appl. No.: 13/641,328

(22) PCT Filed: Mar. 22, 2011

(86) PCT No.: PCT/FR2011/050598
§ 371 (c)(1),
(2), (4) Date: Nov. 26, 2012

(87) PCT Pub. No.: WO2011/128544
PCT Pub. Date: Oct. 20, 2011

(65) Prior Publication Data
US 2013/0108250 A1    May 2, 2013

(30) Foreign Application Priority Data

Apr. 14, 2010   (FR) ...................... 10 52842

(51) Int. Cl.
| | | |
|---|---|---|
| E03B 7/10 | (2006.01) | |
| F16L 53/00 | (2006.01) | |
| B32B 1/08 | (2006.01) | |

(Continued)

(52) U.S. Cl.
CPC .......... *F16L 53/004* (2013.01); *Y10T 29/49083* (2015.01); *B29C 53/581* (2013.01); *B32B 1/08* (2013.01); *B32B 27/304* (2013.01); *B32B 27/34* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2307/206* (2013.01); *B32B 2597/00* (2013.01); *H05B 3/145* (2013.01); *H05B 2214/03* (2013.01); *F16L 55/00* (2013.01); *F16L 53/005* (2013.01)

(58) Field of Classification Search
None
See application file for complete search history.

(56) References Cited

U.S. PATENT DOCUMENTS

| | | | |
|---|---|---|---|
| 3,668,369 A | 6/1972 | Howe | |
| 4,038,519 A | 7/1977 | Foucras | |

(Continued)

FOREIGN PATENT DOCUMENTS

| | | | |
|---|---|---|---|
| CN | 2375842 A | 4/2000 | |
| CN | 2436761 Y | 6/2001 | |

(Continued)

OTHER PUBLICATIONS

Notice of Allowance and Examiner's Amendment from related U.S. Appl. No. 13/641,352 dated Dec. 26, 2013, 10 pgs.

(Continued)

*Primary Examiner* — Thor Campbell
(74) *Attorney, Agent, or Firm* — Patterson Thuente Pedersen, P.A.

(57) ABSTRACT

The invention relates to a line for transporting a hydrocarbon. The line comprises a hollow tube having an electrically insulating outer surface, a heating layer with carbon fibers embedded in a polymer material, an electrical insulation layer arranged on the heating layer, a reinforcing layer with carbon fibers embedded in a polymer material arranged on the electrical insulation layer, and power supply means for feeding an electrical current to the heating layer for heating the tube.

21 Claims, 2 Drawing Sheets

(51) Int. Cl.
    *B32B 27/30*     (2006.01)
    *B32B 27/34*     (2006.01)
    *H05B 3/14*     (2006.01)
    *F16L 55/00*     (2006.01)
    *B29C 53/58*     (2006.01)

(56) References Cited

U.S. PATENT DOCUMENTS

| | | |
|---|---|---|
| 4,281,238 A | 7/1981 | Noma et al. |
| 4,407,351 A | 10/1983 | Backlund |
| 4,594,068 A | 6/1986 | Bardutzky et al. |
| 4,918,814 A | 4/1990 | Redmond et al. |
| 4,923,704 A | 5/1990 | Levinson |
| 5,010,440 A | 4/1991 | Endo |
| 5,394,507 A | 2/1995 | Okamoto |
| 6,229,123 B1 | 5/2001 | Kochman et al. |
| 6,605,168 B1 | 8/2003 | Bleibler et al. |
| 6,772,840 B2 | 8/2004 | Headworth |
| 6,939,082 B1 | 9/2005 | Baugh |
| 7,268,562 B2 | 9/2007 | Aisenbrey |
| 7,628,943 B2 | 12/2009 | Blackmore et al. |
| 2003/0056954 A1 | 3/2003 | Headworth |
| 2003/0213556 A1 | 11/2003 | Blackmore et al. |
| 2006/0102615 A1 | 5/2006 | Carriere |
| 2006/0196568 A1 | 9/2006 | Leeser et al. |
| 2008/0063478 A1 | 3/2008 | Reddy |
| 2008/0066822 A1 | 3/2008 | Varkey et al. |
| 2008/0272110 A1 | 11/2008 | Kamiyama et al. |
| 2009/0000681 A1 | 1/2009 | Averbuch et al. |
| 2009/0107986 A1 | 4/2009 | Naylor et al. |
| 2009/0205737 A1* | 8/2009 | Dinon et al. .......... 138/149 |
| 2010/0209085 A1 | 8/2010 | Ellis et al. |
| 2011/0008030 A1 | 1/2011 | Luo et al. |
| 2011/0052328 A1 | 3/2011 | Frerich et al. |
| 2013/0108250 A1 | 5/2013 | Bigex et al. |

FOREIGN PATENT DOCUMENTS

| | | |
|---|---|---|
| CN | 2456001 Y | 10/2001 |
| CN | 2475967 Y | 2/2002 |
| CN | 1353309 A | 6/2002 |
| CN | 2504482 Y | 8/2002 |
| CN | 2643131 Y | 9/2004 |
| CN | 2720443 Y | 8/2005 |
| CN | 1695929 A | 11/2005 |
| CN | 2775451 Y | 4/2006 |
| CN | 2800021 Y | 7/2006 |
| CN | 200941686 Y | 8/2007 |
| CN | 101275691 A | 10/2008 |
| CN | 201191920 Y | 2/2009 |
| CN | 101529148 A | 9/2009 |
| CN | 201354918 Y | 12/2009 |
| EP | 0 312 204 A2 | 4/1989 |
| EP | 1 367 859 A2 | 12/2003 |
| EP | 1 912 006 A2 | 4/2008 |
| EP | 2009338 A1 | 12/2008 |
| FR | 2873952 A1 | 2/2006 |
| FR | 2913364 A1 | 9/2008 |
| GB | 2 182 413 A | 5/1987 |
| GB | 2 247 507 A | 3/1992 |
| GB | 2 446 506 A | 8/2008 |
| JP | 402106888 | 4/1990 |
| JP | 2005324367 A | 11/2005 |
| WO | WO 96/05386 A1 | 2/1996 |
| WO | WO 97/31507 A1 | 8/1997 |
| WO | WO 97/40309 A1 | 10/1997 |
| WO | WO 99/06652 | 2/1999 |
| WO | WO 99/67561 A1 | 12/1999 |
| WO | WO 01/42338 A2 | 6/2001 |

OTHER PUBLICATIONS

Bardon, et al. "Hydrate Prevention With Electrically Heated Jumpers", Offshore Technology Conference, Apr. 30-May 3, 2007, pp. 1-8.

Application and File history for U.S. Appl. No. 13/641,344, filed Nov. 26, 2012. Inventors: Thibaud Bigex et al.

Application and File history for U.S. Appl. No. 13/641,337, filed Oct. 15, 2012. Inventors: Thibaud Bigex et al.

Application and File history for U.S. Appl. No. 13/641,352, filed Oct. 15, 2012. Inventors: Thibaud Bigex et al.

* cited by examiner

LINE FOR TRANSPORTING A FLUID CONTAINING A HYDROCARBON, AND METHOD FOR PRODUCING SUCH A LINE

PRIORITY CLAIM

The present application is a National Phase entry of PCT Application No. PCT/FR2011/050598, filed Mar. 22, 2011, which claims priority from French Application No. 1052842, filed Apr. 14, 2010, the disclosures of which are hereby incorporated by reference herein in their entirety.

FIELD OF THE INVENTION

This invention relates to lines for transporting a fluid containing a hydrocarbon.

BACKGROUND OF THE INVENTION

Lines for transporting a fluid containing hydrocarbons are now commonly used in very cold environments on land and at sea, sometimes at very great depths underwater. Under such conditions, the fluid may freeze or congeal or paraffin formation may occur. These fluid reactions can cause plugging and interfere with fluid transport in the line. That is why such lines are sometimes heated to prevent these problems. One known technique is electrical heating of such lines by copper conductors placed on the tubes.

Document CN2800021-Y describes such a line for the transport of a hydrocarbon, having a plastic tube reinforced with fiberglass, a first layer of carbon fiber, and a second layer of plastic reinforced by fiberglass. The first layer can be supplied with electricity to heat the tube.

Such lines using carbon fibers as an electrical conductor heat the fluid more efficiently and more evenly than conductive copper lines.

The object of this invention is to perfect these types of lines, and in particular to improve their mechanical strength.

SUMMARY OF THE INVENTION

A line for transporting a fluid containing a hydrocarbon according to one embodiment of the invention includes:
   a hollow tube extending in a longitudinal direction and intended for transporting said fluid in the tube, said tube having at least one electrically insulating outer surface,
   a heating layer on the tube, and comprising carbon fibers embedded in a polymer material,
   an electrically insulating layer on the heating layer, comprising an electrically insulating material,
   a reinforcing layer on the electrically insulating layer, and comprising a reinforcing filler embedded in a polymer material, said reinforcing layer being suitable to stiffen the line, said reinforcing filler comprising carbon fibers, and
   electrical power supply means intended to bring an electrical current to said heating layer, said electrical current flowing in said heating layer in order to heat the tube.

With these arrangements, in particular the fact of using a reinforcing filler comprising carbon fibers, the reinforcing layer has greater mechanical strength than the second layer of the prior art. It makes it possible, for example, to withstand very strong external pressures, e.g., greater than 200 bar, so that such a line can be used offshore at great depths.

In addition, a line of this type is lighter, which facilitates transport and installation.

In various embodiments of the line according to the invention, one or more of the following arrangements may optionally be used:
   the carbon fibers of the heating layer are wound around the tube with a first predetermined angle suitable to obtain an electrical resistance of said heating layer, and the carbon fibers of the reinforcing layer are wound around the tube with at least a second predetermined angle suitable to obtain a mechanical strength of said reinforcing layer;
   the line further comprises assembly means at each end of the tube intended for securing the line to another device, such as another line, said other device comprising complementary assembly means, said assembly means being rigidly connected to the reinforcing layer and being suitable for holding the power supply means of the heating layer;
   the electrically insulating material of the electrically insulating layer comprises fiberglass or Kevlar fibers, embedded in a polymer material;
   the electrical power supply means comprise a connection element coming into contact with a transverse surface located at one end of the heating layer in the longitudinal direction;
   the electrical power supply means comprise a connection element having an annular shape in a transverse cross-section and a bevelled shape in a longitudinal cross-section, said connection element being mounted in a groove of the heating layer, said groove having a shape complementary to that of the connection element;
   the electrical power supply means comprise at least one receiving device connected to the heating layer and suitable for receiving a magnetic induction field and for generating the electrical current in the heating layer, said magnetic induction field being output by a transmitting device located at a distance from the heating layer;
   the line further comprises at least one temperature sensor intended to be connected to control means for regulating the electrical current in the heating layer;
   the temperature sensor comprises an optical fiber suitable for measuring at least one temperature profile along the line in the longitudinal direction;
   the tube is made of polymer material and the optical fiber is embedded in the tube.

The invention also relates to a method of producing a line for the transport of a fluid containing a hydrocarbon, said line comprising a hollow tube extending in a longitudinal direction and intended for transporting said fluid in the tube, said tube having at least one electrically insulating outer surface, said method comprising at least the following successive steps:
   formation of a heating layer on the tube, said heating layer comprising carbon fibers embedded in a polymer material,
   formation of an electrically insulating layer on the heating layer, said electrically insulating layer comprising an electrically insulating material,
   formation of a reinforcing layer on the electrically insulating layer, said reinforcing layer comprising a reinforcing filler embedded in a polymer material, said reinforcing layer being suitable to stiffen the line, said reinforcing filler comprising carbon fibers, and
   placement of electrical power supply means for bringing an electrical current to said heating layer, said electrical current flowing in said heating layer to heat the tube.

In various embodiments of the method for producing the line according to the invention, one or both of the following arrangements may optionally be used:

the formation of each layer is achieved by:
spirally applying at least one strip of appropriate composite around the previous layer, and
heating that strip for a predetermined time to partially melt the polymer material of the strip so that it adheres to the preceding layer;
the formed line is machined to make a groove with a beveled bottom in the heating layer, said groove being suitable to accommodate at least one connection element of a complementary shape.

BRIEF DESCRIPTION OF THE DRAWINGS

Other features and advantages of this invention will become apparent from the following description of one of its embodiments, given as a non-limiting example, with reference to the attached drawings.

In the drawings.

In the various figures, the same references designate identical or similar elements.

DETAILED DESCRIPTION OF THE DRAWINGS

The longitudinal direction mentioned in this description should be understood as the direction going in the direction X designated on the figures. A transverse direction mentioned in this description should be understood as the direction Y or Z designated on the figures. These directions are mentioned only to assist with reading and understanding the invention.

The term "line" in this invention should be understood as a device comprising a tube for transporting a fluid between at least one inlet and one outlet, said device possibly comprising other elements, such as a valve or multiple bypasses.

Figure 1B:
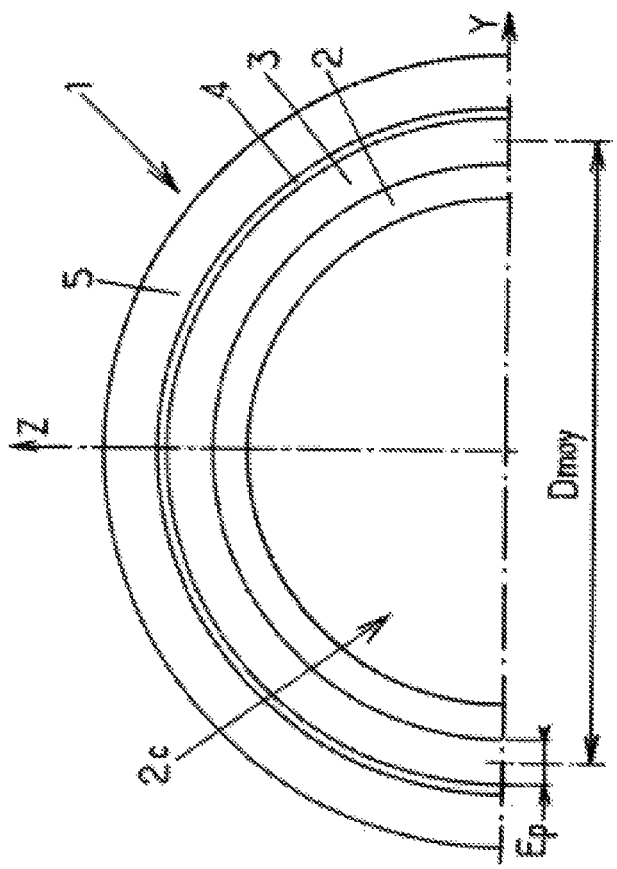
FIG. 1b is a transverse side view of the line from FIG. 1a, FIG. 2 is an enlarged view of a variant of the heating layer of the line from FIG. 1.
Figure 1A:
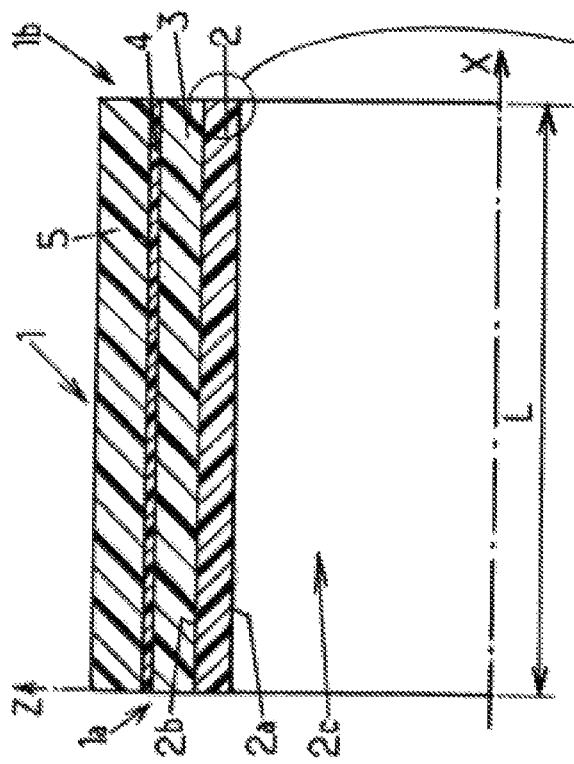
FIG. 1a is a longitudinal cross-section view of a line according to the invention.

FIGS. 1a and 1b show a line 1 according to the invention in a longitudinal cross-section in plane XZ and in a transverse cross-section in plane YZ. In these figures, only an upper half above the X axis is shown, the lower half being substantially identical by symmetry with the X axis.

The line 1 comprises a hollow tube 2, extending in the longitudinal direction of the X axis between a first and second end (1a, 1b) of the line. This tube 2 comprises an inner surface 2a in proximity to the X axis, and an outer surface 2b farther from the X axis. Inside the inner surface 2a, there extends a cavity 2c between an inlet and an outlet of the cavity located at each end. The cavity 2c is suitable for transporting the fluid between said inlet and outlet.

FIG. 1b shows that line 1 has a substantially cylindrical shape, but other forms could be implemented.

The tube 2 can be made with an electrically insulating material, for example a polymer. This material may advantageously be a polyamide (PA) or a polyvinylidene difluoride (PVDF).

Figure 2:
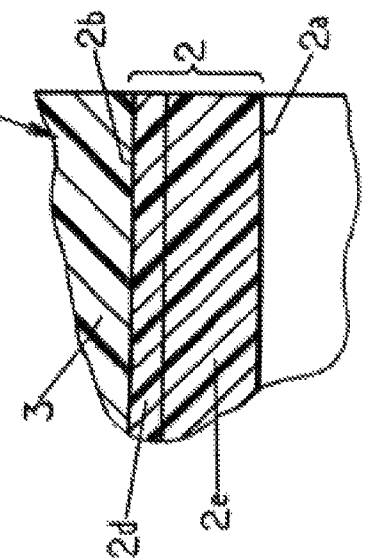

The tube 2 can also be made with an electrically conductive material, for example steel. In that case, it will comprise, at least on its outer surface 2b, one electrically insulating layer 2d visible in FIG. 2, for example composed of one of the polymers mentioned above, or a composite comprising fiberglass or Kevlar fibers embedded in a polymer material of the same type mentioned above. This electrically insulating layer 2d has a thickness in a transverse direction, for example between 0.5 mm and 10 mm, in particular as a function of the voltage V of the heating layer 3.

At least the following layers are applied to this tube 2 of the line 1:
one heating layer 3,
one electrical insulation layer 4, and
one reinforcing layer 5.

The heating layer 3 is a composite comprising at least carbon fibers embedded in a polymer. This polymer may advantageously be a polyamide (PA) or a polyvinylidene difluoride (PVDF).

Carbon fibers are capable of conducting an electrical current to heat the tube by Joule effect. The electrical resistance R of such a heating layer 3 between the first and second ends (1a, 1b) of the line can be approximated with the following formula:

$$R = \rho_{fibre} \cdot \frac{L}{\pi \cdot D_{moy} \cdot \cos^2\alpha \cdot E_p}$$

where:
$\rho_{fibre}$ is a resistivity of the carbon fibers, having for example $\rho_{fibre}=1,9.10^{-5}$ Ω·m as a value at a temperature of 20° C., which is substantially 1100 times more resistive than copper at 20° C.,
L is a length of the heating layer 3 between the first and second ends (1a, 1b) in the longitudinal direction X,
$D_{moy}$ is a mean diameter of the heating layer 3,
$E_p$ is a thickness of the heating layer in a transverse direction, and
α is an angle of inclination formed by the carbon fibers relative to the direction of axis X.

The thickness $E_p$ and the angle of inclination α make it possible, when sizing, to define the electrical resistance of the heating layer 3, and therefore the electrical power P consumed to heat the tube 2. That electrical power P is equal to $P=V^2/R$, where V is an electrical voltage supplied to said heating layer 3 between the first and second ends.

The angle of inclination α can assume any value between 0 degrees and 70 degrees. However, for ease of manufacturing and because of the risk of delamination of the composite when bending the line 1 (for example, during placement on the seabed) when a low value is used for the angle of inclination, this angle of inclination a will advantageously be greater than 10 degrees.

For an angle of inclination range of between 10 degrees and 70 degrees, the coefficient $\cos^2\alpha$ substantially varies between 0.12 and 0.97, which means that the electrical resistance R of the heating layer 3 may vary over a very wide range by defining only that angle of inclination a of the carbon fibers.

The heating layer 3 can be manufactured by known means of the type presented in publication FR-2,873,952, using preformed strips of composite, each strip extending in a main direction and comprising carbon fibers embedded in a polymer, said carbon fibers being oriented substantially in said main direction of the preformed strip.

The heating layer 3 can be made of a stack of sub-layers, each sub-layer comprising carbon fibers angled at a predetermined angle of inclination $\alpha_i$ relative to the longitudinal direction X. Each sub-layer thus comprises carbon fibers with an angle of inclination that differs from the adjacent sub-layer. For example, each sub-layer is formed using preformed strips, as explained above. As a variant, two successive sub-layers can have opposite angles of inclination to form a grid in the shape of rhombi when viewed from an outer surface of the heating layer 3.

Each sub-layer of index i has an angle of inclination i has a thickness $E_p$, a mean diameter $D_{moy}$, and has a basic electrical resistance $R_i$. The basic electrical resistance $R_i$ of each sub-layer of index i can be calculated by the above formula for a layer having carbon fibers at a single angle of inclination. The electrical resistance R of the heating layer 3 can then be calculated by placing the basic resistances $R_i$ of each sub-layer in parallel, i.e., with $$1/R = \sum_i 1/R_i.$$

With the angle of inclination of the carbon fibers in the heating layer 3, the desired electrical resistance R can be obtained for heating.

With this heating layer 3 comprising carbon fibers properly distributed in the polymer material, the heating is more even around the tube 2. In addition, if one or more carbon fibers are broken somewhere on the line, the electrical current continues to flow. Also, if a plurality of sub-layers with different angles is used, then the carbon fibers intersect and are at least partially in mutual contact, such that the electrical current and the heating remain uniform in the heating layer 3. Only the area where the fibers are broken is affected. Such a line 1 is thus very tolerant of manufacturing defects and handling accidents that can result in localized damage.

The electrical insulation layer 4 is electrically insulating. It is composed, for example, of a composite comprising fiberglass embedded in a polymer. The polymer is advantageously suitable for adhering well to the previous layer (the heating layer 3). It may be identical to the polymer used in this heating layer 3.

The electrical insulation layer 4 must be thick enough to prevent any loss of electrical current from the heating layer 3, even when the line 1 is deformed or bent. The transverse thickness of this electrically insulating layer 4 is, for example, between 0.5 mm and 10 mm, in particular as a function of the voltage V of the heating layer 3.

The reinforcing layer 5 is a composite comprising at least a reinforcing filler embedded in a polymer, the reinforcing filler comprising at least carbon fibers and the polymer. The polymer is advantageously suitable for adhering to the previous layer (the electrically insulating layer 4). It is advantageous to use the same polymer for all three layers: heating layer 3, electrically insulating layer 4, and reinforcing layer 5. Furthermore, the tube 2 is advantageously made with this same polymer. The line 1 is a multilayer composite comprising a polymer such as a polyamide (PA) or a polyvinylidene difluoride (PVDF). It is then possible to produce such a line in a very long length and in a fully automated manner. With this arrangement, the cost of such a line is low, even if it comprises an expensive material such as carbon fiber.

However, the use of a reinforcing filler made of carbon fiber has at least two drawbacks which prompt a person skilled in the art not to use it: It is more expensive than fiberglass, and it is electrically conductive, which requires the use of at least one electrically insulating layer 4 between the heating layer 3 and the reinforcement layer 5, and thus complicates the production of the line.

However, carbon fibers are stronger than fiberglass, so that the amount of carbon fibers required to achieve the same mechanical strength is lower. Therefore, the added cost for the product related to the material is lower than that of the material itself, and the resulting line 1 has a smaller footprint or outer diameter.

The reinforcing layer 5 can be manufactured with the same technique as for the heating layer 3. It may include a plurality of sub-layers, each sub-layer comprising carbon fibers inclined at a predetermined angle of inclination. Furthermore, each sub-layer may be formed using preformed strips. Additionally, the angle of inclination of a sub-layer has a value opposite to the angle of inclination of a neighboring or adjacent sub-layer. The angle of inclination of these sub-layers is thus advantageously between 20 degrees and 70 degrees.

With the reinforcing layer 5, the line 1 is very rigid. It can bear very high external pressure, for example greater than 100 bar and preferably greater than 200 bar. For better resistance to external pressure, the angle of inclination will advantageously be between 60 and 70 degrees, and preferably close to 65 degrees. The reinforcement layer 5 is thus more rigid than the tube 2, and gives the line 1 its great rigidity.

With the reinforcing layer 5, the line 1 is also resistant to very high compressive forces. For better compressive or tensile strength in the longitudinal direction X, the angle of inclination will advantageously be between 20 and 30 degrees, and preferably close to 25 degrees.

The line 1 is also resistant to very high bending forces. It can be wound with a small radius of curvature, for example less than 20 m, and preferably less than 10 m. An angle of inclination between 50 and 70 degrees will be preferred for obtaining a small radius of curvature. The line can then be used in deep sea without the risk of being damaged during installation, whether using the "S-lay" or "J-lay" technique in which the line forms one or more bends before resting on the seabed.

With the angle of inclination of the carbon fibers in the reinforcing layer 5, a desired mechanical resistance can be obtained for the line against pressure, longitudinal compression or tension, or bending stress.

With this very rigid reinforcing layer 5, the tube 2 may have a small thickness and be made of a less rigid material than the reinforcing layer 5, meaning it is only able to support the manufacture of successive layers on said tube and not the stresses of the external pressure on the line 1. The heating layer 3 is then a short distance from the inner surface 2a of the tube 2 and the heating of the transported fluid is more efficient. In addition, less power is required for heating the fluid.

For example, a tube 6 inches in diameter (approximately 15 cm in diameter), comprising 54 layers of carbon fibers embedded in a Polyamide PA11 polymer with first sub-layers having ±25 degree angles of inclination and second sub-layers having ±65 degree angles, said sub-layers representing a thickness of 15 mm, has the following mechanical properties: resistance to external pressure of 245 bar, resistance to internal fluid pressure of 1500 bar, and tensile strength of 550 metric tons.

Figure 3:
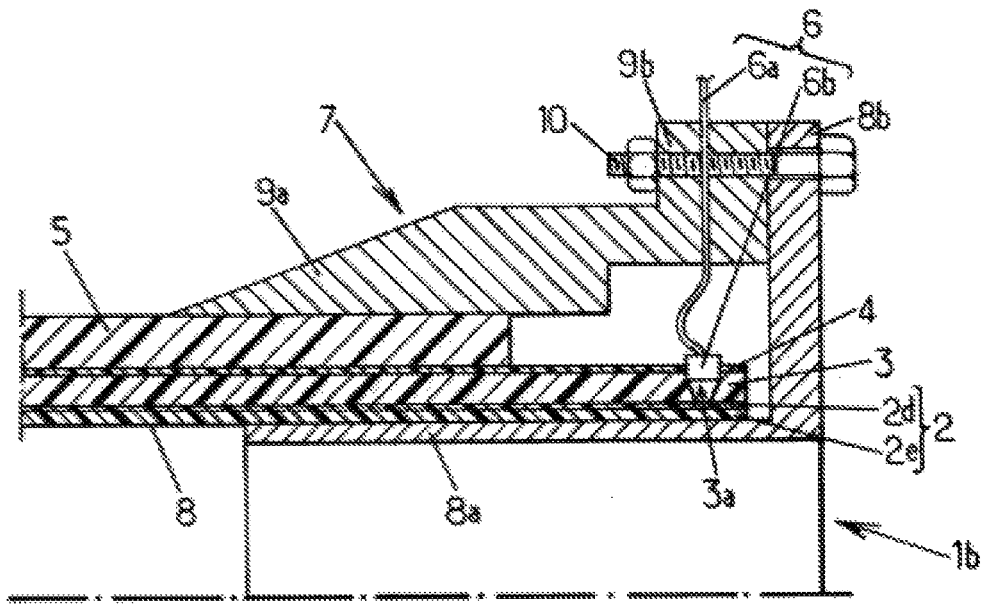
FIG. 3 is a longitudinal cross-section view of one end of the line from FIG. 1 and showing the power supply and assembly means.

FIG. 3 shows one embodiment of an end 1b of the line according to the invention, comprising:
  electrical power supply means 6 for the heating layer 3, intended to bring electrical current to the heating layer 3, and
  mechanical assembly means 7 for the line, intended to connect it with another device or with another line comprising identical or complementary assembly means.

Each end 1a, 1b of the line 1 comprises an electrical power supply means, such that a voltage V applied between the two electrical power supply means causes an electrical current I to flow in the heating layer 3. By Ohm's law, we have: I=V/R.

The electrical power supply means 6 shown comprise a cable 6a in relation to the outside of the line 1, and a connection element 6b coming into contact with the carbon fibers of the heating layer 3 and connected to said cable 6a.

According to a first variant (not shown), the connection element 6b is in contact with the carbon fibers of the heating layer 3 on a transverse contact surface of said heating layer 3, said contact surface being substantially perpendicular to the longitudinal direction X and located at one longitudinal end of said heating layer 3. This contact surface is substantially annular.

According to a second variant, shown in FIG. 3, the connection element 6b has a beveled shape in a longitudinal cross-section, and enters a groove 3a of the heating layer 3 to come into contact with the carbon fibers of the heating layer 3 on a contact surface in said groove 3a. The connection element 6b and the groove 3a have an annular shape around the longitudinal axis X.

With this arrangement, the contact surface between the connection element 6b and the heating layer 3 is increased.

Figure 4:
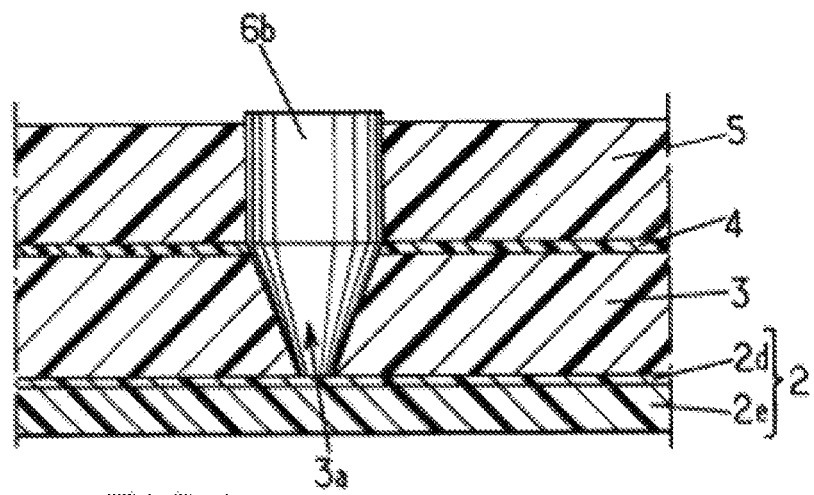
FIG. 4 is an enlarged view of a variant of the power supply means of the line from FIG. 1.

According to a third variant, which FIG. 4 shows in an enlarged view, the groove 3a passes through the reinforcement layer 5, the electrical insulation layer 4, and heating layer 3. The connection element 6b is electrically insulated from the reinforcing layer 5 by a coating to prevent any loss of electrical current in said reinforcing layer 5. One end of the connection element 6b has a beveled shape, as in the previous variant, for coming into contact with the carbon fibers of the heating layer 3.

According to a fourth variant (not shown), the electrical power supply means 6 comprise at least one receiving device connected to the heating layer 3 and suitable for receiving a magnetic induction field and for generating electrical current. The magnetic induction field is emitted by a transmitting device located at a distance from said heating layer.

With this arrangement, energy is transmitted from the outside of the line 1 to the heating layer 3, without contact. The cable 6a of the preceding variants, which passes transversely through the line 1 between the outside and the heating layer, is eliminated. Achieving fluid-tightness of the power supply means 6 and the assembly means 7 is simplified.

Assembly means 7 are shown in FIG. 3. These assembly means 7 comprise for example:
- a first part 8 connected to the tube 2, comprising for example a longitudinal portion 8a fastened to the tube 2 extending in the longitudinal direction X, then a radial portion 8b extending outwardly, and
- a second part 9 comprising a longitudinal portion 9a mounted to be fluid-tight on an outer surface of the line 1, and a radial portion fastened to the radial portion 8b of the first part 8 by clamping means 10 such as bolts.

These assembly means 7 may also be suitable for holding the power supply means 6 of the heating layer 3.

Above the previously described layers, the line 1 may also include (not shown):
- a heat insulation layer around the reinforcing layer 5, intended to thermally insulate the line 1 from the outside,
- a rigid outer tube surrounding said heat insulation layer, and
- spacing means placed between the tube 2 and the outer tube.

The spacing means are suitable for securely holding the outer tube at a distance from the tube 2 and for protecting the heat insulation layer from high external pressure outside the line 1.

The outer tube may be made of steel or a composite comprising carbon fibers and a polymer such as a polyamide (PA) or a polyvinylidene difluoride (PVDF). The outer tube then has all the advantages and all the properties described for the reinforcing layer 5.

Finally, the line 1 may comprise a temperature sensor intended to be connected to control means for regulating the electrical current in the heating layer 3.

The temperature sensor may comprise an optical fiber suitable for measuring a temperature profile along the line 1 in the longitudinal direction X. The control means thus receives a plurality of temperature measurements, each measurement corresponding to a different position along the line 1 in the longitudinal direction X.

The optical fiber may be embedded in one of the previous composites, i.e., in the heating layer 3, in the electrical insulation layer 4, or in the reinforcing layer 5.

Advantageously, the tube 2 will be made of polymer and the temperature sensor or the optical fiber will be embedded in the tube 2, so that the temperature sensor measures at least one temperature between the heating layer 3 and the inner surface 2a of the tube 2. Such a measurement closer to the fluid gives more representative information for the regulation of the control means.

The line 1 may be manufactured by the following method.

Said line comprises a hollow tube 2 extending in a longitudinal direction X and intended for transporting the fluid in the tube, said tube 2 having at least one electrically insulating outer surface 2a.

The method comprises at least the following successive steps:
- formation of a heating layer 3 on the tube, said heating layer 3 comprising carbon fibers embedded in a polymer material,
- formation of an electrically insulating layer 4 on the heating layer 3, said electrically insulating layer 4 comprising an electrically insulating material,
- formation of a reinforcing layer 5 on the electrically insulating layer 4, said reinforcing layer 5 comprising a reinforcing filler embedded in a polymer material, said reinforcing layer 5 being suitable to stiffen the line, said reinforcing filler comprising carbon fibers, and
- placement of electrical power supply means 6 for bringing an electrical current to said heating layer 3, said electrical current flowing in said heating layer 3 to heat the tube 2.

The formation of each layer is achieved by:
- spirally applying at least one strip of appropriate composite around the previous layer, and
- heating that strip for a predetermined time to partially melt the polymer material of the strip so that it adheres to the preceding layer.

Optionally, the formed line is machined to make a groove 3a with a beveled bottom in the heating layer 3, said groove 3a being suitable to accommodate at least one connection element 6b of a complementary shape.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A line for transporting a fluid containing a hydrocarbon, said line comprising:
    a hollow tube extending in a longitudinal direction and intended for transporting said fluid in the tube, said tube having at least one electrically insulating outer surface (2b),
    a heating layer on the tube, said heating layer comprising carbon fibers embedded in a polymer material,
    an electrically insulating layer on the heating layer comprising an electrically insulating material,
    a reinforcing layer on the electrically insulating layer, and comprising a reinforcing filler embedded in a polymer material, said reinforcing layer being suitable to stiffen the line, said reinforcing filler comprising carbon fibers, and
    electrical power supply means intended to bring an electrical current to said heating layer, said electrical current flowing in said heating layer in order to heat the tube;
    and wherein the carbon fibers of the heating layer are wound around the tube with a first predetermined angle suitable to obtain an electrical resistance of said heating layer.

2. The line according to claim 1, wherein:
    the carbon fibers of the reinforcing layer are wound around the tube with at least a second predetermined angle suitable to obtain a mechanical strength of said reinforcing layer.

3. The line according to claim 1, further comprising assembly means at each end of the tube intended for securing the line to another device, such as another line, said other device comprising complementary assembly means, said assembly means being rigidly connected to the reinforcing layer and being suitable for holding the power supply means of the heating layer.

4. The line according to claim 1, wherein the electrically insulating material of the electrically insulating layer comprises fiberglass or Kevlar fibers, embedded in a polymer material.

5. The line according to claim 1, wherein the electrical power supply means comprises a connection element coming into contact with a transverse surface located at one end of the heating layer in the longitudinal direction.

6. The line according to claim 1, wherein the electrical power supply means comprises a connection element having an annular shape in a transverse cross-section and a bevelled shape in a longitudinal cross-section, said connection element being mounted in a groove of the heating layer, said groove having a shape complementary to that of the connection element.

7. The line according to claim 1, wherein the electrical power supply means comprises at least one receiving device connected to the heating layer and suitable for receiving a magnetic induction field and for generating the electrical current in the heating layer, said magnetic induction field being output by a transmitting device located at a distance from the heating layer.

8. The line according to claim 1, further comprising at least one temperature sensor intended to be connected to control means for regulating the electrical current in the heating layer.

9. The line according to claim 8, wherein the temperature sensor comprises an optical fiber suitable for measuring at least one temperature profile along the line in the longitudinal direction.

10. The line according to claim 9, wherein the tube is made of polymer material and the optical fiber is embedded in the tube.

11. A method for producing a line for the transport of a fluid containing a hydrocarbon, said line comprising a hollow tube extending in a longitudinal direction and intended for transporting said fluid in the tube, said tube having at least one electrically insulating outer surface, said method comprising at least the following successive steps:
    forming a heating layer on the tube, said heating layer comprising carbon fibers embedded in a polymer material, and the carbon fibers of the heating layer being wound around the tube with a first predetermined angle suitable to obtain an electrical resistance of said heating layer,
    forming an electrically insulating layer on the heating layer, said electrically insulating layer comprising an electrically insulating material,
    forming a reinforcing layer on the electrically insulating layer, said reinforcing layer comprising a reinforcing filler embedded in a polymer material, said reinforcing layer being suitable to stiffen the line, said reinforcing filler comprising carbon fibers, and
    placing electrical power supply means for bringing an electrical current to said heating layer, said electrical current flowing in said heating layer to heat the tube.

12. The method according to claim 11, wherein forming each layer is achieved by:
    spirally applying at least one strip of appropriate composite around the previous layer, and
    heating that strip for a predetermined time to partially melt the polymer material of the strip so that it adheres to the preceding layer.

13. The method according to claim 11, wherein the formed line is machined to make a groove with a beveled bottom in the heating layer, said groove being suitable to accommodate at least one connection element of a complementary shape.

14. Line according to claim 1, wherein the electrical resistance of the heating layer is determined by the following formula:

$$R = \rho_{fibre} \cdot \frac{L}{\pi \cdot D_{moy} \cdot \cos^2\alpha \cdot E_p}$$

where:
   $\rho_{fibre}$ is a resistivity of the carbon fibers,
   L is a length of the heating layer in the longitudinal direction,
   $D_{moy}$ is a mean diameter of the heating layer,
   $E_p$ is a thickness of the heating layer in a transverse direction, and
   $\alpha$ is the first predetermined angle of inclination formed by the carbon fibers relative to the longitudinal direction.

15. The line according to claim 1, wherein the first predetermined angle is comprised in a range of between 10 degrees and 70 degrees.

16. The line according to claim 1, wherein the heating layer is a stack of sub-layers, each sub-layer comprising carbon fibers angled at a predetermined angle of inclination $\alpha_i$ relative to the longitudinal direction, and each sub-layer comprises carbon fibers with an angle of inclination that differs from the adjacent sub-layer.

17. The line according to claim 16, wherein two successive sub-layers in the stack of sub-layers have opposite angles of inclination.

18. The method according to claim 11, wherein the electrical resistance of the heating layer is determined by the following formula:

$$R = \rho_{fibre} \cdot \frac{L}{\pi \cdot D_{moy} \cdot \cos^2\alpha \cdot E_p}$$

$\rho_{fibre}$ is a resistivity of the carbon fibers,

L is a length of the heating layer in the longitudinal direction, $D_{moy}$ is a mean diameter of the heating layer, $E_p$ is a thickness of the heating layer in a transverse direction, and $\alpha$ is the first predetermined angle of inclination formed by the carbon fibers relative to the longitudinal direction.

19. The method according to claim 11, wherein the first predetermined angle is comprised in a range of between 10 degrees and 70 degrees.

20. The method according to claim 11, wherein the heating layer is formed by a stack of sub-layers, each sub-layer comprising carbon fibers angled at a predetermined angle of inclination $\alpha_i$ relative to the longitudinal direction, and each sub-layer comprises carbon fibers with an angle of inclination that differs from the adjacent sub-layer.

21. The method according to claim 16, wherein two successive sub-layers in the stack of sub-layers have opposite angles of inclination.

* * * * *